United States Patent [19]

Toyoda et al.

[11] Patent Number: 4,907,467
[45] Date of Patent: Mar. 13, 1990

[54] STRUCTURE OF FIRST ARM OF INDUSTRIAL ROBOT HAVING ARTICULATED HORIZONTAL ARMS

[75] Inventors: Kenichi Toyoda, Hino; Nobutoshi Toril, Hachioji; Ryo Nihei, Musashino; Akihiro Terada, Hino, all of Japan

[73] Assignee: Fanuc Ltd., Yamanashi, Japan

[21] Appl. No.: 246,825

[22] PCT Filed: Nov. 25, 1987

[86] PCT No.: PCT/JP87/00910
§ 371 Date: Aug. 12, 1988
§ 102(e) Date: Aug. 12, 1988

[87] PCT Pub. No.: WO88/04979
PCT Pub. Date: Jul. 14, 1988

[30] Foreign Application Priority Data

Dec. 24, 1986 [JP] Japan ................................. 61-306289

[51] Int. Cl.⁴ ..................... G05G 11/00; B25J 17/00; B25J 18/00
[52] U.S. Cl. ........................ 74/479; 901/23; 901/28
[58] Field of Search ..................... 74/479; 901/23, 24, 901/28

[56] References Cited

U.S. PATENT DOCUMENTS

| | | | |
|---|---|---|---|
| 4,398,110 | 8/1983 | Flinchbaugh | 901/23 X |
| 4,552,505 | 11/1985 | Gorman | 901/23 X |
| 4,651,591 | 3/1987 | Wurst | 901/23 X |
| 4,678,952 | 7/1987 | Peterson et al. | 901/29 X |

FOREIGN PATENT DOCUMENTS

| | | |
|---|---|---|
| 59-69892 | 5/1984 | Japan . |
| 60-103690 | 7/1985 | Japan . |
| 61-117691 | 7/1987 | Japan . |
| 1313710 | 5/1987 | U.S.S.R. ................................. 901/23 |

Primary Examiner—Allan D. Herrmann
Attorney, Agent, or Firm—Armstrong, Nikaido, Marmelstein, Kubovcik & Murray

[57] ABSTRACT

Provided is a compact first arm (12) of an industrial robot having articulated horizontal arms, which first arm has a direct drive motor (19), an electromagnetic brake (25), and a rotary encoder (34, 36) disposed close to each other concentrically between the first arm (12) and a base post (10) supporting the first arm (12), and has another direct drive motor (39), another electromagnetic brake (45), and another rotary encoder (54, 56) disposed close to each other concentrically between the first arm (12) and a second arm (14) rotatably supported by the first arm (12).

3 Claims, 1 Drawing Sheet

STRUCTURE OF FIRST ARM OF INDUSTRIAL ROBOT HAVING ARTICULATED HORIZONTAL ARMS

TECHNICAL FIELD

The present invention relates to a structure of the first arm of an industrial robot having articulated horizontal arms, particularly to the structure of the first arm having a direct drive motor, etc., built therein to realize a compact unit.

BACKGROUND ART

An industrial robot having articulated horizontal arms usually comprises a vertical post fixed to a floor, a first arm rotatably attached to the post, a second arm rotatably attached to the first arm, and a wrist portion attached to an end of the second arm, which wrist portion rotatable and can move linearly. Of course, other industrial robots having articulated horizontal arms exist, such as a robot which comprises an inner trunk body movable upward and downward on the base of the vertical post, the first arm being rotatably attached to the inner trunk body, but an indirect drive motor driving through a transmission mechanism may be adopted as a drive motor for the first arm or the second arm in such an industrial robot having articulated horizontal arms. When a direct drive motor is adopted, a robot does not necessarily have a compact structure, since it must be equipped with a brake unit and a rotation position detector.

DISCLOSURE OF THE INVENTION

Accordingly, an object of the present invention is to solve the above problems by disposing direct drive motors, brake units, and rotation position detectors for the first and second arms in a compact form in the first arm, to make the robot compact.

In view of the above-mentioned object, the present invention provides a structure of a first arm of an industrial robot having articulated horizontal arms, characterized in that a first direct drive motor is disposed at one end of the first arm coaxially with a first central axis thereof for rotating the first arm, that a first brake means and a first rotation position detector means coaxial with the first central axis are juxtapositioned adjacent to the first direct drive motor, that a second direct drive motor is disposed at the other end of the first arm coaxially with a second central axis thereof for rotating a second arm, which second arm can rotate on the base of the first arm, and that a second brake means and a second rotation position detector means coaxial with the second central axis are juxtapositioned adjacent to the second direct drive motor.

The structure is made compact by a juxtaposition of the coaxial rotation position detector means and the brake means adjacent to the direct drive motor. Therefore, the industrial robot having articulated horizontal arms can be made compact so that the possibility of interference with an apparatus or an object to be handled in an operating region can be reduced.

BEST MODE FOR CARRYING OUT THE INVENTION

Figure 1:
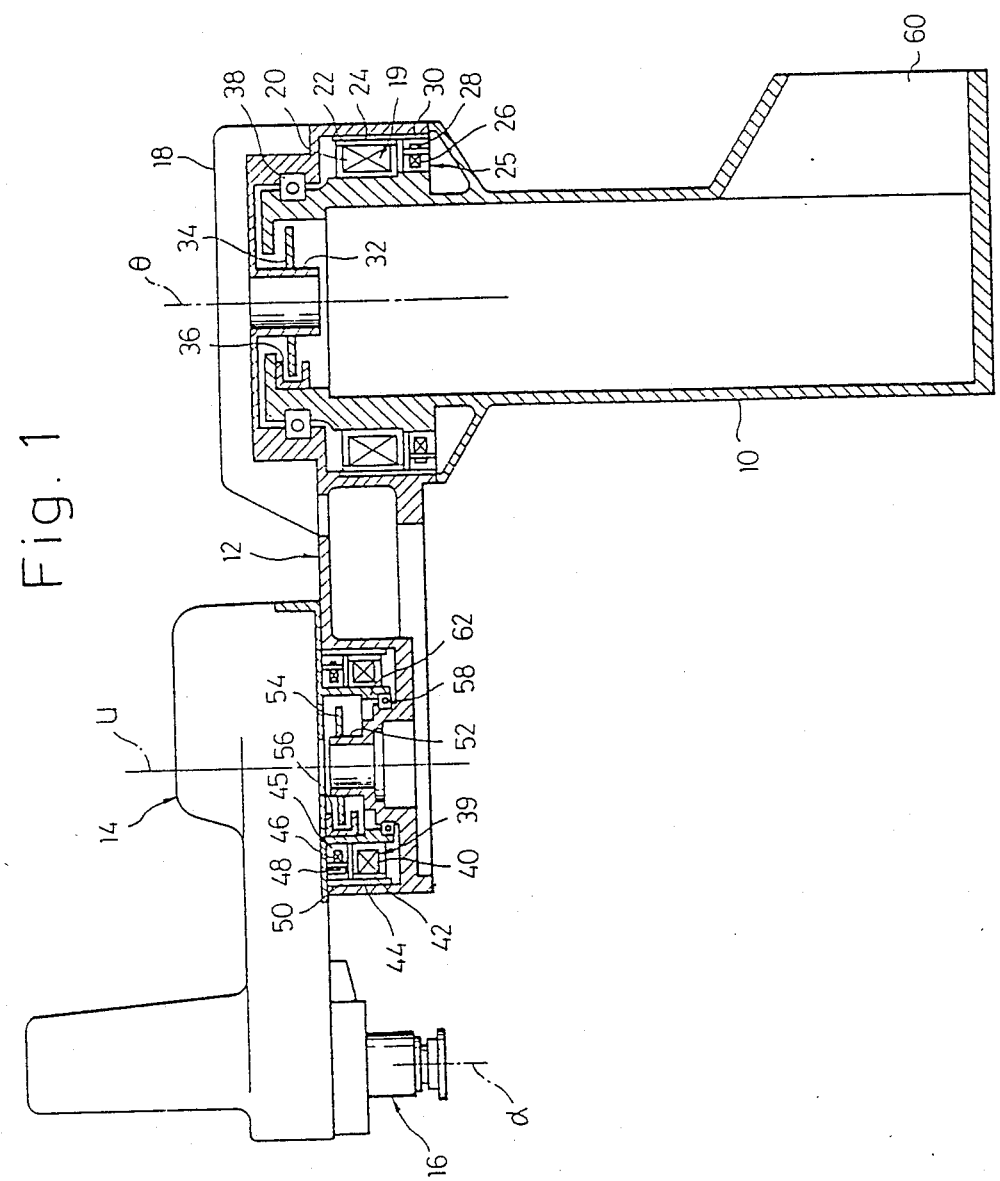
FIG. 1 a partial longitudinal sectional view of an industrial robot having articulated horizontal arms, one of the arms having a structure according to the present invention.

The present invention will be described in detail hereinafter according to the embodiment shown in the attached drawing. An industrial robot having articulated horizontal arms comprises a vertical post 10 fixed to a floor, a first arm 12 rotatably mounted on the vertical post 10 and able to rotate around a vertical axis $\theta$, a second arm 14 rotatably attached to one end portion of the first arm 12 and able to rotate around a vertical axis u and a wrist portion 16 attached to one end portion of the second arm 14, which wrist portion can rotate around a vertical axis $\alpha$ and move upward and downward along the axis $\alpha$.

Now a structure for rotating the first arm 12 around the axis $\theta$ will be described. The first arm 12 is attached to the top of the vertical post 10 through a bearing 38 to enable a precise rotation thereof, and a direct drive motor 19 is disposed around the axis $\theta$ at a lower portion adjacent to the bearing 38. An armature 20 of the motor 19 is fixed to the vertical post 10, and a magnet 22 of a magnetic field pole is fixed to the first arm 12 through a yoke 24. An electromagnetic brake 25 is juxtapositioned adjacent to the motor 19 at a lower portion, and exciting pole 26 is fixed to the vertical post 10. The exciting pole 26 causes a brake shoe 28 to retract from a friction drum 30 fixed to the first arm 12, by an electromagnetic force thereof, during operation of the first arm 12. The above-mentioned yoke 24 and the friction drum 30 are integrated as one body because the motor 19 and the electromagnetic brake 25 are positioned close to each other in this embodiment.

A rotary plate 34 of a rotary encoder is fixed to a hollow cylindrical shaft 32 extending from the first arm 12 and vertically projecting into an inside of the vertical post 10 so that a central axis thereof coincides with the above-mentioned axis $\theta$. On the other hand, a stationary plate 36 is fixed to the upper portion of the inside of the vertical post 10 corresponding to the rotary plate 34.

According to the above-mentioned structure, the first arm 12 can be rotated around the axis $\theta$, and the rotation thereof can be controlled. Furthermore, electrical lead wires and working fluid tubes for a robot hand can be disposed at the end of the first arm 12 through the hollow cylindrical shaft 32 and a cover 18 from a hole 60 at a lower portion of the vertical post.

A structure for rotating the second arm 14 around the axis u will be described hereinafter. A hollow cylindrical portion 62 is projected from the bottom end of the second arm 14, and rotatably mounted on the end portion of the first arm 12 through a bearing 58. A central axis of the hollow cylindrical portion 62 coincides with the axis u. Another direct drive motor 39 for the second arm is attached to a lower outer surface of the hollow cylindrical portion 62. An armature 40 of the motor 39 is fixed to the lower outer portion of the hollow cylindrical portion 62, and a magnet 42 of a magnetic field pole is fixed to the first arm 12 through a yoke 44. Another electromagnetic brake 45 is juxtapositioned at a position just above the motor 39, and exciting pole 46 is fixed to the hollow cylindrical portion 62. The exciting pole 46 causes a brake shoe 48 to retract from a friction drum 50 fixed to the first arm 12 by an electromagnetic force thereof during operation of the second arm 14. The yoke 44 and the friction drum 50 are integrated as one body also in this portion, because the motor 39 and the electromagnetic brake 45 are positioned close to each other. A rotary plate 54 of a rotary encoder for detecting a relative rotation position of the second arm 14 with respect to the first arm 12 is fixed to a hollow cylindrical shaft 52 vertically projected on the first arm 12 and extended into the hollow cylindrical portion 62 so that the central axis thereof coincides with the aforementioned axis u. On the other hand, a stationary plate 56 is fixed to an upper portion of an inside of the hollow cylindrical portion 62 corresponding to the rotary plate 54.

The second arm 14 can rotate around the axis upon the base of the first arm 12 and the rotation thereof be controlled, and lead wires and tubes can be disposed inside the second arm 14 through the hollow cylindrical shaft 52, according to the above-mentioned structure.

As apparent from the foregoing description, an industrial robot can be constructed in a compact form whereby drive units for driving the first arm and the second arm are disposed in the first arm according to the present invention. Furthermore, interference with an apparatus or an object to be treated in a working area can be reduced.

We claim:

1. A structure of a first arm of an industrial robot having articulated horizontal arms, characterized in that a first direct drive motor having a yoke is disposed at one end of said first arm coaxially with a first central axis thereof for rotating said first arm, that a first drum type brake means having a drum integrated with said yoke of said first motor adjacent said brake and a first rotation position detector means coaxial with said first central axis are juxtapositioned adjacent to said first direct drive motor, that a second direct drive motor having a yoke is disposed on the other end of said first arm coaxially with a second central axis for rotating said second arm, which second arm can rotate on the base of said first arm, and that a second drum type brake means having a drum integral with said yoke of said second motor adjacent to said second brake and a second rotation position detector means coaxial with said second central axis are juxtapositioned adjacent to said second direct drive motor.

2. A structure of a first arm of an industrial robot having articulated horizontal arms according to claim 1, wherein a rotary plate, which is one element of said first rotation position detector means, is attached to a projecting portion projecting from said first arm into an inside of a base part supporting said first arm, and wherein another rotary plate, which is one element of said second rotation position detector means is attached to another projecting portion projecting from said first arm into an inside of said second arm.

3. A structure of a first arm of an industrial robot having articulated horizontal arms according to claim 2, wherein said projecting portion and said another projecting portion have a hollow structure, whereby lead wires and tubes, etc., passed through said first arm can be led into said second arm.

* * * * *